L. T. TROLAND

Dec. 6, 1932. COLOR PHOTOGRAPHY Re. 18,680

Original Filed Sept. 9, 1921

Inventor:
Leonard T. Troland.
By Robert Robert & Cushman
his atty's.

Reissued Dec. 6, 1932

Re. 18,680

UNITED STATES PATENT OFFICE

LEONARD T. TROLAND, OF CAMBRIDGE, MASSACHUSETTS, ASSIGNOR TO COMSTOCK & WESCOTT, INC., OF BOSTON, MASSACHUSETTS, A CORPORATION OF MASSACHUSETTS

COLOR PHOTOGRAPHY

Original No. 1,808,584, dated June 2, 1931, Serial No. 499,425, filed September 9, 1921. Application for reissue filed September 24, 1931. Serial No. 564,930.

This invention relates to photographic films and the production and reproduction of same, particularly in color photography, whether for still or motion pictures, this application being in part a continuation of my prior application Serial No. 377,755, filed April 30, 1920.

A principal object of the invention is simultaneously to produce at a single exposure a plurality of separate superposed complemental images on a single film adapted to be used in an ordinary still picture or cinematographic camera without substantial modification of the latter.

Other objects of the invention are to simplify the art of producing color pictures, to reduce the time and cost required to produce such pictures, to afford a simple automatic way of obtaining accurate ratios of exposure between complemental images, to obtain complemental images which are in accurate registry throughout their entire area and which may be reproduced with automatic registry, to secure good definition, to minimize helation and generally to improve the art of color photography.

In order to clarify the subsequent description of the invention the following definitions are here inserted. Unless otherwise specifically limited the term "photographic film" is herein employed generically to include all photographic records or recording articles or devices, whether the emulsion is supported upon celluloid or other support or is self-supporting, and whether the film is adapted for either still or motion pictures. The term "emulsion" is used generically to connote either a true emulsion or other composition which is sensitive to light. The "entrant" side of the emulsion is the side through which the exposing light enters the emulsion, whether or not it be next to the celluloid or other support, and the "emergent" side is the opposite side. The term "color" is used in its most common sense, not as being limited to a pure color but as including a range of colors in which a certain color predominates. The "warmer colors" are those nearer the red end of the spectrum and the "colder colors" are those nearer the violet end of the spectrum. The term "complemental images" is used to designate images representative of different color aspects of an object field, which when combined by printing, projection or otherwise, will yield a more or less accurate color reproduction of the object field, the images themselves not necessarily being colored, and the colors which the images represent not necessarily being exactly complementary. The term "developed images" connotes images which have been developed whether or not they have been subsequently bleached. The term "transparent image" means an image which is substantially transparent to light of one or more colors though not necessarily to all colors.

The invention involves a photographic film having an emulsion which is more sensitive to light of a predetermined color throughout a part of its depth than throughout another part of its depth, or which is predominantly sensitive to one color only throughout a part of its depth, or whose sensitiveness to light is adjusted differently for different colors throughout at least a part of its depth, or preferably which possesses all of these characteristics. The variation of the color sensitiveness of the emulsion may be gradual or by steps or stages. A gradual variation may be obtained by bathing the film in a suitable dye and permitting the dye to penetrate to successive depths in gradually decreasing measure or by thus sensitizing one side of the emulsion with one dye and similarly sensitizing the other side with another dye. A step by step variation may be obtained by building up the emulsion as a succession of layers predominantly sensitive to different colors. However, there are many advantages in forming the emulsion in a single layer and I therefore deem it highly desirable not to form the emulsion in the form of separate superposed coatings.

By exposing the film to light from a multicolored object field an image corresponding to one color aspect of the field is formed throughout the whole or a part of the depth of the emulsion which is predominantly sensitive to that color and an image corresponding to another color aspect of the field is formed throughout the whole or a part of the depth of the emulsion which is sensitive to the other color and so on depending upon the number of complemental images comprised in each set of images. In two-color work a "blue-green" record may be formed in one depth and a "red" record in another depth. After the images are thus formed they may be treated and reproduced in various ways, examples of which will hereinafter be described.

In order to restrict the light reaching the emergent side of the emulsion to the color to which the emergent side is specially sensitized, the whole emulsion, or at least a portion toward the entrant side, is preferably dyed or otherwise colored so as to obstruct light of other colors and to transmit light of the color to which the emergent side is sensitized. This serves to restrict the image or images of the other color or colors to the entrant side of the emulsion. In two-color work, e. g., the emergent side may be sensitized to the warmer colors and the emulsion may be dyed with a dye which will transmit the warmer colors and obstruct the colder colors. When the film is exposed an image of the warmer colors will be formed on the emergent side and an image of the colder colors will be formed on the entrant side. While the light of warmer color passing through the entrant side may expose the entrant side to some extent, and while some of the colder light may penetrate to the emergent side, these effects can be rendered negligible as will hereinafter appear.

For certain uses of the film it is desirable that one of the images be more intense than the other or others. For example, according to one method of using the film hereinafter described one image should be so much more intense than the other or others that in reproducing the images by passing light through all of the images of each complemental set in series the image or images other than the intense image will be negligible for practical purposes compared with the intense image. This may be accomplished in various ways as for example by treating or preparing the emulsion, or at least that part of the emulsion intended to bear the less intense image, so as to render the less intense image relatively flat (i. e. having a relatively low "gamma"). The dye hereinbefore referred to which obstructs the light of the color represented by the entrant image also performs this function, although in order to obtain a pronounced flattening effect the dye should ordinarily be more intensely absorptive than is necessary to prevent the passing of the light of the particular color to the emergent side of the film.

When employing certain of the methods to which my improved film is adapted it is desirable (although not always necessary) that the portions of the light-sensitive strata bearing the respective superposed complemental images be separated by a free gelatine layer. For example, if it is desired to separate the images produced in the portions which are predominantly sensitive to different colors or if it is desired to impregnate or otherwise treat the portion bearing one image without affecting the other image or images, as hereindescribed, it is advantageous to have the portions somewhat separated. This is illustrated in Figs. 1 and 2 by having the cross-hatchings C and W spaced apart with only stippling therebetween.

For good results in two-color work the negative film should have the following characteristics. The entrant stratum of the emulsion should be insensitive or relatively insensitive to orange, red and possibly yellow light, that is, light having wave lengths greater than approximately 590 mμ. This stratum should be sensitive to blue, blue-green, and preferably green and yellow-green light. The same stratum should be of such color as strongly to absorb substantially all of the spectrum to which it is sensitive. The exact degree of this absorption is determined by the method of subsequent treatment and by the effects to be produced in the finished pictures, but in general it should be many times (e. g. of the order of one hundred times) greater than that which results from ordinary impregnation with dyes for the purpose of green sensitizing or orthochromatizing the emulsion. The emergent stratum of the emulsion should be sensitive to orange, red, and possibly yellow light. In general it is immaterial whether this stratum is also sensitive to other rays of the spectrum since the other rays are absorbed before reaching this stratum.

One method of producing a film having the above characteristics involves the use of a recoated film. The first coating of emulsion may have ordinary silver bromide sensitivity, being responsive to ultra-violet, violet, blue and blue-green rays only. The film may then be recoated (on the same side) with an ordinary panchromatic emulsion which is responsive to practically all the rays of the spectrum if previously sensitized to green, yellow and red with isocyanine dyes as orthochrome T (color index 807) and pinacyanol (color index 808) as is customary in making panchromatic emulsion. This recoated film is then bathed in a dye adapted to impregnate the emulsion strongly and to make it strongly absorptive of blue, blue-green, green and yellow-green rays, and preferably at the same time to sensitize the emulsion throughout to green, yellow-green and possibly yellow rays. Instead of incorporating the dye by bathing it may be mixed into the emulsion of the first coating before the conting is applied to the celluloid. This permits a more reliable determination of the concentration of the dye in the emulsion, but in general does not afford such a fast emulsion.

Another method of producing a film having the above characteristics involves the use of a single coating of emulsion. This coating may be first surface-sensitized to the aforesaid warmer colors, by a short bath in said pinacyanol or other red-sensitizing dye, followed by rapid drying, and then bathed in the staining dye, but it is preferable to apply the staining dye before the surface-sensitizing dye inasmuch as the former may cause a further penetration of the latter if applied last. The restriction of the sensitization to the surface may be augmented by the use of additional alcohol in the sensitizing bath.

The dye for staining the negative stock as aforesaid should have the following characteristics. It should be capable of impregnating gelatine strongly. It should absorb blue, blue-green, green and yellow-green rays. It should sensitize silver bromide to green and yellow-green rays. It should not interfere with or destroy the action of the isocyanine or red-sensitizing dye, and it should wash out of the gelatine after development and fixation with fair facility.

I have found that alkaline fluoresceinates and their halogen derivatives, such as uranine (color index 766), eosine (color index 768), sodium di-bromo-fluorescein, erythrosin (color index 772–773), etc., are completely without desensitizing action and otherwise fulfill the aforesaid requirements. Other suitable dyes are filter yellow K and kodachrome red.

A highly satisfactory dye for average conditions is a mixture in aqueous or aqueous-alcoholic solution of uranine (sodium fluoresceinate) and ordinary eosine (sodium tetrabromofluoresceinate), although this mixture permits a certain amount of yellow, in addition to orange and red, to penetrate to the second stratum. Where it is desired to eliminate the yellow rays from the second stratum and to render the first layer more sensitive to these rays, as in taking outdoor scenes where the green of vegetation is involved, better results may be obtained by adding to the above mixture xylene red B (Schultz No. 579). The absorption band of xylene red B ends abruptly at about 600 mμ and the sensitizing action extends approximately to 610 mμ. This dye has all the other desired properties.

In bathing a recoated film such as above described the dye may comprise 90 parts water, 10 parts alcohol, 1 part of said uranine, and 0.2 part of said eosine; or, when employing said xylene red, 90 parts water, 10 parts alcohol, 0.8 part of said uranine, 0.08 part of said eosine, and 0.05 part of said xylene red. To insure adequate and uniform penetration of the dye to the first coating the film is preferably bathed approximately one hour at approximately 65° F. and dried at approximately 70° F.

In the accompanying figures.

Figure 1:
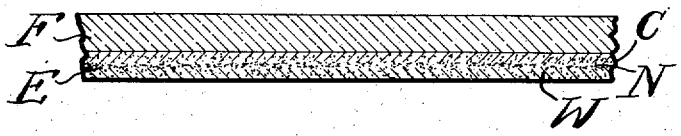
Figure 1 is a diagrammatic view of one form of my improved film.

In Figure 1 I have illustrated one preferred embodiment of the invention wherein F represents a support of celluloid or other suitable material and E represents the emulsion which may be of the kind predominantly sensitive to the colder colors. The emulsion is sensitized to the warmer colors throughout the cross-hatched portion W. This may be acomplished by bathing the film in a sensitizer (e. g., said pinacyanol dissolved in alcohol and water), the sensitizer being permitted to penetrate, at least in substantial measure, only throughout a portion of the depth of the emulsion. The portion W of the emulsion is thus rendered sensitive to the warmer colors and if the emulsion is originally more sensitive to the colder colors the other portion, represented by the cross-hatching C, is predominantly sensitive to the colder colors. The entire emulsion is dyed, preferably in the process of making the emulsion, with a dye which will permit either the warmer or the colder colors to be transmitted predominantly. For example, if the film is to be exposed through the back (i. e., through the celluloid), as is essential for some purposes, the emulsion may be dyed orange as, e. g., by use of dyes previously specified, including one such as said filter yellow K which absorbs violet and ultra violet, thus rendering the emulsion predominantly transmissive to the warmer colors. Upon exposing the film to a colored object or image field through the back, an image representative of the warmer colors is formed in the portion W and a complemental image representative of the colder colors is formed in the portion C. Illustrative ways of utilizing the film will be outlined hereinafter.

Figure 2:
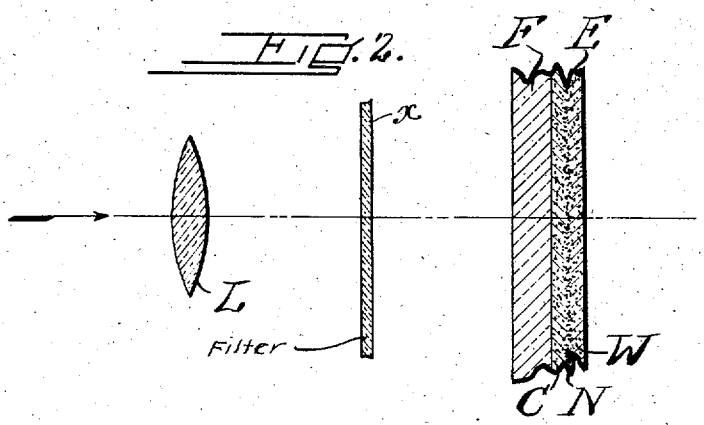
Figure 2 is a diagrammatic view of one way of producing the images thereon.

Fig. 2 shows one method of exposing the film wherein L respresents a focusing lens of a camera, projection printer or the like, and F represents the celluloid, thus illustrating my preferred method of exposing through the celluloid or other support. After the film has been exposed it is developed for the time required to give the proper gradations of the various areas of the images or each set relative to each other and of the respective sets relative to each other.

Instead of using the entire spectrum of colors and dividing the entire light from the object (or image) field into the proper proportions as described, the light may be passed through a color filter adapted to absorb a part of the spectrum before the light reaches the film, in which case a different dye is used in the emulsion to divide the used portion of the spectrum in the desired proportions. For example, the exposing light may be passed through a yellow filter X (Fig. 2) which absorbs the blue end of the spectrum (e. g. violet and ultra violet) and an acid scarlet dye (e. g. said eosin in combination with said uranine in the proportions already stated) may be used in the emulsion to restrict the green component of light to the entrant side and permit the red or orange component to pass to the emergent side. Inasmuch as the filter has substantially no absorbing action on the rays to which the emergent side is sensitive, exposure balance between the complemental images may be regulated by changing the filter.

Instead of using a color filter the celluloid film may be impregnated with a yellow dye having the desired absorption, for example phosphene; or the dye may be applied, as a constituent of gelatine or other transparent coating on the back of the celluloid after the manner of the well-known "non-curling" coating. Another method is to employ an extremely heavy staining of the emulsion itself with a dye very strongly absorbing ultra violet and violet, as for example said filter yellow K or Eastman yellow (color index 640) as already indicated.

Development of the exposed film should be by the time-temperature method, since the ratio between the red and greed records in the two strata of the film depends not only upon exposure but to a considerable degree upon development, both as regards the apparent inertia of the records and their apparent contrast. It is desirable to soak the film in cold water for a few minutes before placing it in the developer; this causes a preliminary swelling of the gelatine and enables development to begin throughout the film more nearly simultaneously than would otherwise be the case.

The green record can often be improved in speed and in the form of its characteristic curve by slightly fogging it previous to development by exposure of the film through the back to rays which are strongly absorbed by the emulsion.

Owing to the fact that the developer acting upon the green record image in the first stratum must first penetrate the second stratum there is a strong tendency for it to become locally exhausted by its reaction with the red record image. This has the effect of producing a local reduction of development of the green record image underneath relatively high densities of the red record image, with a correspondingly bad effect upon the final color rendering. In order to reduce this so-called exhaustion effect to a minimum it is desirable to use a developer possessing a high diffusion tendency and a relatively low reduction potential. Such a developer is hydroquinone combined with an alkaline carbonate (e. g. in the ratio of one part hydroquinone to ten parts of carbonate in one hundred parts of water). A small amount of metol (color index 875) may also be added to render the development more rapid.

After development the negative is fixed in a plain hypo fixing bath, is then washed until the dye has substantially disappeared, and is then dried in any suitable manner.

The following are examples of the uses to which my new film is applicable after it is developed and otherwise suitably treated, two-color films being referred to for the purpose of illustration.

The images on the opposite sides of the emulsion may be separately printed by reflection, either in superposition for any desired "substractive process" or in non-superposed relationship for any desired "additive process". For printing by reflection a layer of opaque white material may be provided in the emulsion as for example in the form of silver bromide not fixed out.

If one of the complemental images (the image representative of the warmer color in the foregoing example) is made much more intense than the other, e. g. ten times as intense, this image may be reproduced by projecting light through both images of a complemental set, the intense image predominating to such extent that the combined effect of all the images is virtually that of the intense image. After the intense image has been reproduced, or in the case of a motion picture film after the series of intense images have been reproduced, the intense image or images may be rendered ineffective, as e. g. by bodily removal after which the less intense image may be reproduced either in superposition with the intense image or otherwise. When the intense image is on the outside of the film as illustrated, it may be removed by bleaching the film in a solution which produces both images in hardened gelatine, and then etching the film in hot water (about 120° F.) which dissolves the soft gelatine between the images and allows the intense image to float off but leaves the other image adhering to the celluloid or other support.

The bleaching solution may comprise approximately 100 parts water, 2 parts chromic acid, 5 parts sodium chloride, and 0.1 part sodium sulphite. Before placing the film in the solution it is preferably soaked in cold water until the gelatine has swelled to approximately an equilibrium condition. The solution converts the silver and at the same time hardens the gelatine in the form of the images. The film is removed from the bleaching solution as soon as the green record image is completely bleached.

I have found that a fresh bleaching solution containing only chromic acid and sodium chloride or an equivalent mixture does not in general yield a very strong gelatine relief. Moreover, there is a tendency for the relief to break up in the etching process. These two tendencies can be remedied by a slight chemical reduction of the bleach, which is accomplished by the addition of sodium sulphite or other reducer. The reduced bleach yields a more pronounced and more coherent relief.

However, an excessive bleach reduction must be avoided, since a greatly reduced bleach, especially if diluted or slow acting, has the peculiar effect of impressing upon the green record relief an image component which is proportional to the superposed red record. In other words a positive of the red record is added to or combined with the green record, for which reason I have called this phenomenon the "bleach-positive effect". This effect can be substantially avoided by employing a rapidly acting bleach, such as above specified, inasmuch as the effect depends upon the diffusion of gelatine-hardening substances from the red record into the stratum occupied by the green record.

The bleach-positive effect is in general the reverse of the exhaustion effect; consequently by regulating the bleach-positive effect as above outlined it may be utilized approximately to neutralize the exhaustion effect.

After the image remaining on the film is thoroughly etched with the hot water to clear up the relief, the silver salts are fixed out in plain hypo, the hypo being subsequently removed by washing, and the film is then preferably dried before further treatment.

The adhering image is then intensified optically after which it may be readily printed. The intensification may be effected by staining the gelatine relief with a dye which strongly absorbs the actinic rays of the spectrum. The dye should have great affinity for gelatine in order to produce a heavy staining of the relatively thin relief; and it should wash out slowly so that the superficial dye adhering to the surface of the film may be rinsed off without unduly bleeding the film. A satisfactory dye for the purpose is croceine scarlet in a 3 per cent. solution with 5 per cent. acetic acid, this dye affording an enormous intensification of the original image. The time of immersion of the film in this solution determines the degree of printing contrast which it attains, the contrast continuing to increase slowly over a period as long as twelve hours. Ordinarily an immersion of about 20 minutes suffices when employing a dye of the above composition. When proper contrast is attained the film is removed from the dye, rinsed and dried rapidly, after which it is ready for printing.

Instead of forming one of the complemental images with negligible contrast and then intensifying it after the more intense image has been reproduced, I have discovered various "subtraction" methods of reproduction which do not depend upon this difference in contrast. When the contrast of the entrant image need not be kept down to a negligible amount, the quantity of dye with which the emulsion is dyed may be greatly reduced, thereby increasing the speed of exposure.

The following is one subtraction method of reproduction such as referred to above. A positive is made by printing through both negative records. The exposure and characteristic curve (depending upon the exposure and the emulsion employed) of the positive should be such as to render it substantially an exact black-and-white complement of the original negative, so that when the two are superposed in registry no picture, either positive or negative, is visible.

The original negative may then be treated to remove the red record by the same or equivalent method as described above for this purpose. It is desirable, however, to retain the silver of the green-record image in its original form and densities. This can be accomplished if the development of the film is initially by means of a pyro formula, which will give hardening of the gelatine in the form of the image simultaneously with development thereof. Any pyro developer containing little or no sulphite preservative may be employed for this purpose. The green-record image thus separated is now superposed in register upon the complement of the total record which was previously obtained. This produces a positive which is substantially that of the red record alone. From this positive is printed a negative which corresponds to the original red-record negative. From these two negatives positives may be formed by any desired process.

With the complemental images formed in different strata in non-interpenetrating relationship the subtraction method above described involves the subtraction of the densities of the respective images, i. e. the logarithms of the respective exposures, in contradistinction to a subtraction of the exposures which would result in using interpenetrating images formed by exposing the same emulsion stratum to the respective color components of light. By subtracting densities instead of exposures the component image resulting from the subtraction process has far more accurate density gradations than when subtracting exposures.

Among the other possible methods of separately reproducing the superposed complemental negatives there are various "redevelopment" methods which do not necessitate making one of the negatives extremely flat. One such method involves converting both negatives into unexposed light-sensitive silver salt, exposing one negative without substantially exposing the other negative, developing the exposed negative, fixing out the silver salt of the unexposed and undeveloped negative with hypo to render the gelatine transparent, printing the redeveloped image, then etching off the printed image leaving the transparent image adhering to the celluloid in the form of a relief, and then staining and printing the relief. The conversion of both images into light-sensitive silver salt may be effected by bleaching in the dark with a solution of copper bromide. One negative may be exposed without substantially exposing the other by heavily dyeing the emulsion, thereby absorbing the light before it reaches the second negative, the dye originally incorporated in the emulsion before the original exposure ordinarily being sufficient for this purpose. In redeveloping the reexposed negative a low potential developer such as hydroquinone is recommended. The negative which is not reexposed and redeveloped may be converted into a transparent relief in either of the aforesaid ways, viz., by using a pyro developer in the initial development or by employing a hardening bleach after the initial development. The transparent relief preferably represents the green aspect of the object field. This mode of reproduction I call the "invisible image" method.

An alternative method of separating the component negative images in preparing the positive is to transform each of these images into an image in pure dye or other coloring matter, each image absorbing exclusively certain spectral rays or colors. For example, in the case of a two-color record the cold color image might be converted into an image in yellow or minus-blue dye and the warm color image into an image in magenta or minus-green dye or other coloring matter. There are various ways in which this could be accomplished. For example, both images may be converted into a dye such as Metanil yellow (color index 138) which when acted upon by an acid becomes magenta in color. A small amount of acid may then be diffused into the film so that the image next to the surface is converted into magenta while the other image is not sensibly affected. Another method is to convert the image next to the surface directly into a magenta dye image by controlled diffusion and then to convert the remaining image into a yellow image by some process which does not affect the first image, such as toning with metallic salts or the use of a dye having chemical properties different from that employed for the first image.

One such method consists in converting both negatives into unexposed light-sensitive silver salt, exposing one negative without substantially exposing the other negative, and then developing the exposed negative, all as above described. The negative which remains in the form of silver salt may be employed as a mordanting base for a dye of the appropriate color which is not absorbed by the metallic silver image. The latter may be colored the desired color by any well-known toning process which does not act upon the silver salt or dye of the other negative. By employing a bleach which will convert the silver into silver iodide in the aforesaid bleaching operation a considerable variety of dyes are available in the mordanting process. For example safranine may be employed to reduce a magenta color. In the toning process a yellow image may be produced by employing a titanium salt. The negatives thus differently colored may be separately printed by using lights of different colors, the light used in printing each negative being absorbed strongly by that negative and weakly, if at all, by the other image.

It is clear that when this conversion of the images into respectively different colors, as above specified, has been accomplished, if blue light is employed to print through the combined film, only the yellow or minus-blue colored image will be printed, since the blue light will not be absorbed by the magenta image. On the other hand, if green light is employed, only the magenta or minus-green image will be printed, since the green light will not be absorbed by the yellow image. In this way it will be possible to effect an optical separation of the two images without removing either of them from the film and also without involving any appreciable adulteration of one image by traces of the other.

In the last aforesaid method the original exposure need not be made through the celluloid or other support inasmuch as it is not necessary physically to separate the negatives. Consequently the original exposure may be made much shorter.

It is evident that a negative film of the character above described may be used to print both negative records simultaneously if a positive film having the general structure of the negative film which is described in these specifications is employed. In this case the two strata of the positive film may be rendered sensitive to blue and green rays respectively, the entrant side of the positive emulsion being sensitive only to the blue while the emergent side is sensitive also to the green. The entire emulsion is stained with a dye which absorbs blue, so that only the green rays reach the emergent side, while only the blue rays can act on the entrant side.

If the multiple colored negative is used to print on such a positive with combined blue and green light, i. e. yellow or possibly white, the cold record image of the negative will be printed on the entrant side of the positive emulsion and the warm record image on the emergent side of the latter.

Figure 3:
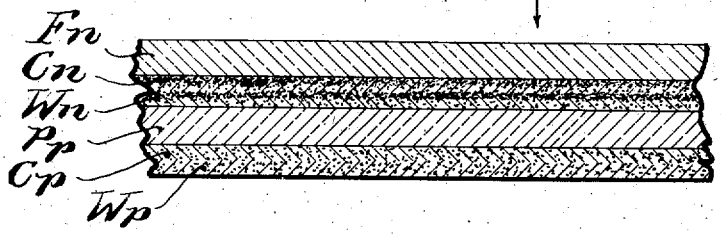
Figure 3 is a diagrammatic view of one way of reproducing same.

This method of printing is illustrated in Fig. 3 wherein F*n* represents the celluloid base of the negative film, C*n* and W*n* the strata of the negative emulsion bearing the cold and warm images respectively, P*p* the celluloid support of the positive film, and C*p* and W*p* the strata of the positive emulsion intended to receive the positive images respectively. The strata C*n* and W*n* may, e. g. be dyed with a blue-absorbing (yellow) dye and with a green-absorbing (magenta) dye respectively, in which case the strata C*p* and W*p* may be receptive to blue and green colors respectively. The arrow at the top of the figure indicates the direction of the printing light, which in this example is preferably formed of blue and green components.

Selective staining of the two separated positive images thus obtained may then be carried out so that the positive from the cold color record is converted into a color complementary to that which originally produced the record in the negative, with a corresponding conversion of the print from the warm color record.

From the foregoing it will be evident that in the more limited aspect of the invention a cardinal feature consists in forming the film so that the face of the emulsion next to the celluloid or other support is the entrant face, instead of the emergent face as is usual, and so that the more intense image is formed on the emergent side of the emulsion.

Figure 4:
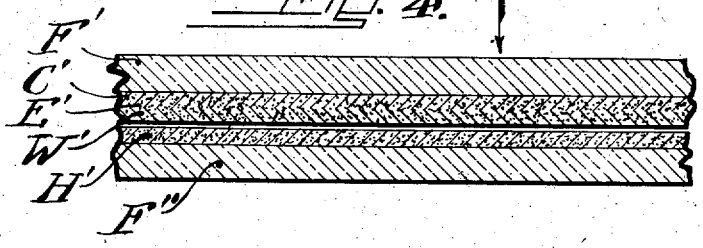
Figure 4 is a diagrammatic view of the application of the invention to the production of three color pictures.

While the invention has been described with particular reference to two-color work it is also applicable to the production of pictures with a greater number of color components, one application to three-color work being illustrated in Fig. 4, where two films, each with its own celluloid base, are employed with their emulsion surfaces in contact.

One of these films may be similar in structure to the one shown in Fig. 1, (differing merely in color sensitivity) and the other an ordinary panchromatic film. Thus in Fig. 4 F′ represents the celluloid of the first film carrying an emulsion E′ the inner stratum C′ of which is sensitive to cold color or colors e. g. violet, blue, and blue-green, and the outer stratum of which is sensitive to warmer color or colors, e. g. green and yellow-green. The outer stratum may or may not be sensitive to the colder colors.

The celluloid of the second film is designated F″ and carries an emulsion H′ which is sensitive to still warmer color or colors, e. g. yellow, orange and red. Either the inner stratum C′ or both strata C′ and W′ are impregnated with a dye which rapidly absorbs the colors to which the inner stratum is sensitive but which does not absorb the colors to which the outer stratum is sensitive. If the stratum H′ is also sensitive to green and yellow-green a filter absorptive of these colors may be provided between the two films, which filter may be in the form of a superficial coating of dye on the face of either film. However, the filter may be eliminated by employing at H′ an emulsion sensitive only to yellow, orange and red.

I suggest the following method of producing films such as above described. The entire emulsion E′ may be dyed with tartrazine and the outer surface of this emulsion may be further dyed with Congo red (color index 370) or rose bengale (color index 777–779). The emulsion H′ may be sensitized throughout with pinacyanol. By using a direct cotton dye, such as Congo red for example, the dye is confined to a very thin stratum at the surface of the emulsion.

With these films in contact (instead of slightly separated as shown in Fig. 4) they are exposed from the side indicated by the arrow. The violet, blue and blue-green rays expose stratum C′ and are absorbed thereby so that none of them reach the other strata. The green and yellow-green rays expose stratum W′. And the yellow, orange and red rays expose emulsion H′. The latent images in strata C′ and W′ are treated and reproduced as described above in connection with the two strata in the two-color processes and the image in emulsion H′ may be developed and printed in the ordinary way, it being understood that the three positives are suitably colored to give the desired color effect when combined.

The present invention affords many advantages over prior methods of making color photographs, viz:

The methods herein described have the obvious advantage over the taking of separation negatives by successive exposures in that both of the negative records must necessarily record the same time phase of the object so that color fringes are impossible. The single exposure also naturally involves fewer operations than the taking of two successive exposures, besides consuming less time.

The requirement of simultaneous exposure on the two-color elements could of course be met by means of a special camera, but the present invention dispenses with the necessity of this very expensive method since it is applicable to any ordinary camera.

The present invention is readily applicable to roll-film cartridge or film-pack cameras, and does not involve any different manipulation than black-and-white film, except as to length of exposure and possibly the use of a color filter although the filter is not essential.

The development of the negatives is similar to the development of black-and-white pictures, especially in that there is only one negative for each finished positive instead of two or more detached component negatives as in other prior processes.

When reproducing one of the complemental negatives by transforming it into a gelatine relief and then dyeing the relief the contrast of the positive printed therefrom can be well controlled by regulating the amount of dye incorporated in the relief, thereby accurately balancing the contrasts of the two positives against each other.

One of the greatest difficulties in securing satisfactory color separation records lies in balancing the exposures. According to this invention exposure balance is practically built into the negative film which has been properly manufactured, so that errors on this point cannot be made by the operator.

The single film feature of the present method permits automatic attainment of register between the two color components of the positive, provided proper devices are employed. For example, the original negative and the positive blanks to be printed upon may be similarly punched and, in printing, these punchings may be held in register by fitting both films over pins so placed in the printing frame as to fit the original perforations. Since the negative is geometrically identical in the printing of both color component positives, the application of the above method insures that both positive films may then be registered with respect to each other (or in the case of imbibition technique with respect to a third element or transfer blank) by use of the same perforations. If the mechanical features of this method are accurately adjusted this insures register of the final color images without placing any reliance on the eyes or mechanical skill of the operator.

Another important advantage of the present invention consists in that the emulsions for the respective complemental images are integrally joined together so that there are no surfaces of separation to scatter the exposing light and produce halation.

For the purpose of simplifying and clarifying the description I have in many instances referred to the images being reproduced as negatives and the images being printed as positives but it is to be understood that the invention is likewise applicable to the production of negatives from positives if such reverse procedure is desired for any purpose.

I claim:

1. A sensitized element for use in color photography comprising an emulsion which is sensitive to complemental colors at different depths respectively.

2. A sensitized element for use in color photography comprising an emulsion which is sensitive to complemental colors at different depths, the first sensitive depth being substantially insensitive to the complemental color to which a succeeding depth is sensitive.

3. A sensitized element for use in color photography comprising a transparent support carrying an emulsion which is sensitive to complemental colors in different strata respectively, the sensitivity to warmer colors progressively increasing from the support outwardly.

4. A sensitized element for use in color photography comprising an emulsion which is sensitive to complemental colors at different depths, the first sensitive depth being substantially absorptive of the complemental color to which it is sensitive.

5. A sensitized element for use in color photography comprising an emulsion which is sensitive to complemental colors at different depths, the first sensitive depth being substantially absorptive of the complemental color to which it is sensitive, and being substantially insensitive to the complemental color to which a succeeding depth is sensitive.

6. A sensitized element for use in color photography comprising a transparent support carrying an emulsion which is sensitive to complemental colors in different strata respectively, the sensitivity to warmer colors progressively increasing from the support outwardly, and the inner stratum being substantially absorptive of the complemental color to which it is sensitive.

7. A sensitized element for use in color photography comprising a transparent support carrying an emulsion which is sensitive to complemental colors in different strata respectively, the sensitivity to warmer colors progressively increasing from the support outwardly, and the inner stratum being substantially insensitive to the complemental color to which a succeeding stratum is sensitive.

8. A sensitized element for use in color photography comprising a transparent support carrying an emulsion which is sensitive to complemental colors in different strata respectively, the sensitivity to warmer colors progressively increasing from the support outwardly, the inner stratum being substantially absorptive of the color to which it is sensitive and being substantially insensitive to the complemental color to which a succeeding stratum is sensitive.

9. A sensitized element for use in color photography comprising an emulsion having a plurality of different strata fast together in superposition, the different strata being sensitive to complemental colors respectively.

10. A sensitized element for use in color photography comprising an emulsion having a plurality of different strata fast together in superposition, the different strata being sensitive to complemental colors respectively, and at least one stratum being substantially insensitive to the complemental color to which a succeeding stratum is sensitive.

11. A sensitized element for use in color photography comprising an emulsion having a plurality of different strata fast together in superposition, the different strata being sensitive to complemental colors respectively, and the first stratum being substantially absorptive of the color to which it is sensitive.

12. A sensitive element for use in color photography comprising an emulsion which is sensitive to different colors at different depths, the first sensitive depth being substantially absorptive of the color to which it is sensitive.

13. A sensitive element for use in color photography comprising an emulsion which is sensitive to one color on its emergent side and on its entrant side is both sensitive and relatively opaque to another color.

14. A sensitized element for use in color photography comprising a transparent support carrying an emulsion which is sensitive to different colors in different strata respectively, the sensitivity to warmer colors progressively increasing from the support outwardly, and the inner stratum being substantially absorptive of the color to which it is sensitive.

15. A sensitized element for use in color photography comprising a transparent support carrying an emulsion which is sensitive to different colors in different strata respectively, the sensitivity to warmer colors progressively increasing from the support outwardly, and the inner stratum being substantially insensitive to a color to which a succeeding stratum is sensitive.

16. A sensitized element for use in color photography comprising a transparent support carrying an emulsion which is sensitive to different colors in different strata respectively, the sensitivity to warmer colors progressively increasing from the support outwardly, the inner stratum being substantially absorptive of the color to which it is sensitive and being substantially insensitive to a color to which a succeeding stratum is sensitive.

17. A sensitized element for use in color photography comprising an emulsion having a plurality of different strata fast together in superposition, the different strata being sensitive to different colors and one stratum being substantially absorptive of the color to which it is sensitive, the latter stratum being nearer the entrant side of the emulsion than another stratum.

18. A sensitized element for use in color photography comprising an emulsion having a plurality of different strata fast together in superposition, one stratum being substantially opaque to the color to which it is sensitive and being substantially insensitive to the color to which a succeeding stratum is sensitive.

19. A sensitive element for use in color photography comprising an emulsion which is sensitive to different colors at different depths, one depth being sensitive to reddish color and a depth in advance thereof being both sensitive and substantially opaque to a colder color.

20. A sensitive element for use in color photography comprising an emulsion which is sensitive to different colors in different strata, an outer stratum being sensitive to a reddish color and an inner stratum being both sensitive and substantially opaque to a colder color.

21. A sensitive element for use in color photography comprising an emulsion which is sensitive to different colors in different strata, an outer stratum being sensitive to a reddish color and an inner stratum being both sensitive and substantially opaque to a colder color, and the latter stratum being substantially insensitive to the reddish color.

22. A sensitive element for use in color photography comprising an emulsion which is sensitive to a reddish color on its emergent side and which is both sensitive and substantially opaque to a greenish color on its entrant side.

23. A sensitive element for use in color photography comprising an emulsion which is sensitive to different colors in different strata, an outer stratum being sensitive to a reddish color and an inner stratum being both sensitive and substantially opaque to a greenish color.

24. A sensitized element for use in color photography comprising an emulsion having a plurality of different strata fast together in superposition, one stratum being sensitive to a reddish color and another stratum in advance thereof being both sensitive and substantially opaque to a colder color.

25. A sensitized element for use in color photography comprising an emulsion having a plurality of different strata fast together in superposition, one stratum being sensitive to a reddish color and another stratum in advance thereof being both sensitive and substantially opaque to a greenish color.

26. A sensitive element for use in color photography comprising an emulsion having a layer sensitive to red and a layer both sensitive and substantially opaque to green.

27. A sensitive element for use in color photography comprising an emulsion having a layer sensitive to red and a layer both sensitive and substantially opaque to green, and also substantially insensitive to red.

28. A sensitive element for use in color photography comprising a transparent support carrying an emulison which is sensitive to different colors in different strata, an outer stratum being sensitive to red and an inner stratum being both sensitive and substantially opaque to green.

29. A sensitive element for use in color photography comprising a transparent support carrying an emulsion which is sensitive to different colors in different strata, an outer stratum being sensitive to red and an inner stratum being both sensitive and substantially opaque to green, and also substantially insensitive to red.

30. A sensitive element for use in color photography comprising an emulsion having a layer sensitive to red and orange and a layer both sensitive and substantially opaque to green and blue-green.

31. A sensitive element for use in color photography comprising a transparent support carrying an emulsion which is sensitive to different colors in different strata, an outer stratum being sensitive to red and orange and an inner stratum being both sensitive and substantially opaque to green and blue-green.

32. A sensitive element for use in color photography comprising a layer of emulsion sensitized to reddish light and a layer of emulsion dyed with xylene red.

33. A sensitive element for use in color photography comprising a layer of emulsion sensitized to reddish light and a layer of emulsion dyed with uranine and eosine.

34. A sensitive element for use in color photography comprising a layer of emulsion sensitized to reddish light and a layer of emulsion dyed with uranine, eosine and xylene red.

35. A sensitive element for use in color photography comprising a layer of emulsion sensitized to reddish light and a superposed layer of emulsion dyed with a solution containing approximately one-tenth to two-tenths per cent. eosine and at least approximately five times as much uranine.

36. A sensitive element for use in color photography comprising a layer of emulsion sensitized to reddish light and a superposed layer of emulsion dyed with a solution containing approximately one-half per cent. uranine, one-tenth per cent. eosine and five-hundredths per cent. xylene red.

37. An emulsion sensitive to reddish light and dyed with a dye which further sensitizes to a colder color without substantially desensitizing to reddish light.

38. An emulsion sensitive to reddish light and dyed with a dye which further sensitizes to a greenish color without substantially desensitizing to reddish light.

39. A photographic film for making color pictures which comprises an emulsion having one stratum which is sensitive to a color to which another stratum on the entrant side of said first stratum is substantially insensitive and the latter stratum being sufficiently absorptive of other colors substantially to restrict the exposure of the said first stratum to light of said first color.

40. A photographic film for making superposed complemental images which comprises an emulsion having different strata sensitive to complemental colors, one stratum being sufficiently absorptive of colors other than the color to which a succeeding stratum is sensitive effectively to restrict the exposure of the latter stratum to the color to which it is sensitive.

41. A photographic film for making color pictures which comprises an emulsion having one stratum which is sensitive to a reddish color to which another stratum on the entrant side of said first stratum is substantially insensitive and the latter stratum being sufficiently absorptive of colder colors to cause said first stratum to record an image of the reddish color aspect of an object field to which the emulsion is exposed from said entrant side.

42. A photographic film for making superposed complemental images which comprises an emulsion whose strata are sensitive to complemental colors, one stratum being substantially insensitive to the complemental color to which a succeeding stratum is sensitive and being sufficiently absorptive of the complemental color to which it is sensitive simultaneously to cause said strata respectively to record complemental images of said color aspects of an object field to which the emulsion is exposed from the side of the latter stratum.

43. A photographic film for making superposed complemental images which comprises an emulsion having one stratum which is sensitive to a reddish color and another stratum which is sensitive to a complemental color but relatively insensitive to the reddish color, the latter stratum being sufficiently absorptive of said complemental color simultaneously to cause said strata respectively to record complemental images of said color aspects of an object field to which the emulsion is exposed from the side of the latter stratum.

44. A photographic film for making superposed complemental images which comprises an emulsion having different strata differently sensitized to complemental colors respectively.

45. A photographic film for making superposed complemental images comprising an emulsion having different strata differently sensitized, one stratum being sensitive to a reddish color and another stratum being sensitive to a complemental color.

46. A photographic film for making superposed complemental images comprising an emulsion having different strata differently sensitized, an outer stratum being sensitive to a reddish color and an inner stratum being sensitive to a colder color.

47. A photographic film for making superposed complemental images comprising an emulsion having different strata differently sensitized, an outer stratum being sensitive to a reddish color and an inner stratum being sensitive to a complemental color.

48. A photographic film for making superposed complemental images comprising an emulsion having different strata differently sensitized, one stratum being sensitive to a reddish color and another stratum being sensitive to a greenish color.

49. A photographic film comprising a single emulsion coating substantially sensitized to one color only throughout a portion of its depth.

50. A photographic film comprising a single emulsion coating substantially sensitized to one color only throughout its outer stratum.

51. A photographic film comprising a single emulsion coating substantially sensitized to reddish color only throughout a portion of its depth.

52. A photographic film comprising a single emulsion coating substantially sensitized to reddish color only throughout its outer stratum.

53. A photographic film for making color pictures which comprises a single emulsion coating having one stratum which is sensitive to a color to which another stratum on the entrant side of said first stratum is substantially insensitive and the latter stratum being sufficiently absorptive of other colors substantially to restrict the exposure of the said first stratum to light of said first color.

54. A photographic film for making superposed complemental images which comprises a single emulsion coating having different strata sensitive to complemental colors, one stratum being sufficiently absorptive of colors other than the color to which a succeeding stratum is sensitive effectively to restrict the exposure of the latter stratum to the color to which it is sensitive.

55. A photographic film for making color pictures which comprises a single emulsion coating having one stratum which is sensitive to a reddish color to which another stratum on the entrant side of said first stratum is substantially insensitive and the latter stratum being sufficiently absorptive of colder colors to cause said first stratum to record an image of the reddish color aspect of an object field to which the emulsion is exposed from said entrant side.

56. A photographic film for making superposed complemental images which comprises a single emulsion coating whose strata are sensitive to complemental colors, one stratum being substantially insensitive to the complemental color to which a succeeding stratum is sensitive and being sufficiently absorptive of the complemental color to which it is sensitive simultaneously to cause said strata respectively to record complemental images of said color aspects of an object field to which the emulsion is exposed from the side of the latter stratum.

57. A photographic film for making superposed complemental images which comprises a single emulsion coating having one stratum which is sensitive to a reddish color and another stratum which is sensitive to a complemental color but relatively insensitive to the reddish color, the latter stratum being sufficiently absorptive of said complemental color simultaneously to cause said strata respectively to record complemental images of said color aspects of an object field to which the emulsion is exposed from the side of the latter stratum.

58. A photographic film for making superposed complemental images which comprises a single emulsion coating having different strata differently sensitized to complemental colors respectively.

59. A photographic film for making superposed complemental images comprising a single emulsion coating having different strata differently sensitized, one stratum being sensitive to a reddish color and another stratum being sensitive to a complemental color.

60. A photographic film for making superposed complemental images comprising a single emulsion coating having different strata differently sensitized, an outer stratum being sensitive to a reddish color and an inner stratum being sensitive to a colder color.

61. A photographic film for making superposed complemental images comprising a single emulsion having different strata differently sensitized, an outer stratum being sensitive to a reddish color and an inner stratum being sensitive to a complemental color.

62. A photographic film for making superposed complemental images comprising a single emulsion coating having different strata differently sensitized, one stratum being sensitive to a reddish color and another stratum being sensitive to a greenish color.

63. A color photographic film or plate bearing an emulsion sensitized to record the color values of one portion of the spectrum, said emulsion being transparent to certain of said color values and being treated to restrict the remainder of said color values substantially to the surface of the emulsion.

64. A color photographic film or plate comprising an emulsion sensitized to the orange red of the spectrum, a second emulsion sensitized to the blue-green of the spectrum and colored yellow to thereby diminish the effect of the blue-violet values upon the body of the second emulsion.

65. A color photographic film or plate comprising an emulsion sensitized to the orange red of the spectrum, a second emulsion sensitized to the blue-green of the spectrum and having incorporated therein a yellow dye for the purpose of restricting the blue-violet record to the surface of the second emulsion, but permitting a green record throughout the body of the said second emulsion.

66. A photographic film comprising a support carrying on one side thereof strata of emulsions having different sensitivity for recording different color aspects of a scene in these strata respectively and an intermediate stratum having different characteristics and being permeable to developer.

67. A photographic film comprising a support carrying on one side thereof strata of emulsions having different sensitivity for recording different color aspects of a scene in these strata respectively and an intermediate stratum which is relatively insensitive and permeable to developer.

68. A photographic film comprising a support carrying on one side thereof three separately applied layers, the first and last of said layers having different sensitivity for recording different color aspects of a scene, and each of the three layers being permeable to developer.

69. A photographic film comprising a support carrying on one side thereof three separately applied layers, the first and last of said layers having different sensitivity for recording different color aspects of a scene and the intermediate layer comprising gelatine substantially free from sensitivity.

70. A photographic film comprising a support carrying on one side thereof three strata for recording different color aspects in the first and last stata respectively, at least one stratum in advance of the last stratum being largely absorptive of light of the color corresponding to the record of the first stratum, and each stratum being permeable to developer.

71. A photographic film comprising a support carrying on one side thereof three separately applied layers for recording different color aspects in the first and last layers respectively, at least one layer in advance of the last layer being largely absorptive of light of the color corresponding to the record of the first layer, and each layer being permeable to developer.

72. A photographic film comprising three strata of gelatine integrally throughout their transverse and longitudinal coextents, the first and last strata being sensitized to record different color aspects and one of the strata in advance of the last stratum being largely absorptive of light of the color corresponding to the record of the first stratum.

73. A photographic film comprising three separately applied layers of gelatine integrally united throughout their transverse and longitudinal coextents, the first and last layers being sensitized to record different color aspects, and one of the layers in advance of the last layer being largely absorptive of light of the color corresponding to the record of the first layer.

74. A photographic film comprising three strata of gelatine integrally united throughout their transverse and longitudinal coextents, the first and last strata being sensitized to record different color aspects, and one of the strata in advance of the last stratum being largely absorptive of light of the color corresponding to the record of the first stratum and the absorptive stratum being relatively insensitive.

75. A photographic film comprising three separately applied layers of gelatine integrally united throughout their transverse and longitudinal coextents, the first and last layers being sensitized to record different color aspects and one of the layers in advance of the last layer being largely absorptive of light of the color corresponding to the record of the first layer and the absorptive layer being free from sensitivity.

76. A photographic film comprising a support carrying on one side thereof three coatings of gelatine directly connected to each other, the first and last coatings being sensitized and one coating being larged absorptive of light to which both of the sensitized coatings are sensitive.

77. A photographic film comprising a support carrying on one side thereof three strata integrally united throughout their transverse and longitudinal extents, the first and last strata being sensitized and one stratum being largely absorptive of light, and each stratum being permeable to developer.

78. A transparent support having a photographic emulsion, the outer surface of said emulsion being superficially dyed with a direct cotton dye.

79. A transparent support having a photographic emulsion, the outer surface of said emulsion being dyed with Congo red.

80. A transparent support having a photographic emulsion impregnated with a light absorbing dye, and being superficially coated with a dye absorbent of light to which said emulsion is sensitive.

81. A support having a photographic emulsion sensitive to a portion of the spectral range, a second support having a photographic emulsion sensitive to another portion of the spectrum, the outer surface of one of said emulsions being dyed with Congo red, said emulsions being placed in close contact between the two supports.

82. The method of making a sensitized element for use in color photography which comprises forming a film and sensitizing different strata thereof to complemental colors.

83. The method of making a sensitized element for use in color photography which comprises forming a film sensitizing different strata thereof to complemental colors, and rendering the entrant stratum substantially absorptive of the color to which it is sensitive.

84. The method of making a sensitized element for use in color photography which comprises forming a film, sensitizing different strata thereof to complemental colors, and rendering the entrant stratum substantially absorptive of the color to which it is sensitized, one stratum being sensitized by bathing after the emulsion has solidified.

85. The method of making a sensitized element for use in color photography which comprises forming a film and sensitizing different strata thereof to complemental colors, one stratum being sensitized before it is joined to another stratum.

86. The method of making a sensitized element for use in color photography which comprises forming a film and sensitizing different strata thereof to complemental colors, one stratum being sensitized before it is joined to another stratum and the other stratum being sensitized by bathing after the two strata have been joined.

87. The method of making a sensitized element for use in color photography which comprises coating a transparent support with a layer of emulsion, recoating the support with another layer of emulsion presensitized to reddish color, and then sensitizing the first emulsion to a greenish color.

88. The method of making a sensitized element for use in color photography which comprises coating a transparent support with a layer of emulsion, recoating the support with another layer of emulsion presensitized to reddish color, and then bathing the element in a dye adapted to sensitize the first layer to a greenish color without desensitizing the second layer to the reddish color.

89. The method of making a sensitized element for use in color photography which comprises coating a support with superposed strata of emulsion, sensitizing one stratum to one color, sensitizing another stratum to another color, and staining the latter stratum to render it substantially opaque to the color to which it is sensitized.

90. The method of making a sensitized element for use in color photography which comprises coating a support with an emulsion substantially insensitive to light of certain color, recoating the support with an emulsion, sensitizing the latter coating to said color, and dyeing the first coating to render it sensitive and substantially opaque to another color.

91. The method of making a sensitized element for use in color photography which comprises coating a support with an emulsion substantially insensitive to light of certain color, recoating the support with an emulsion, sensitizing the latter coating to said color, and rendering the first coating sensitive and substantially opaque to another color with a dye which does not desensitize the second coating.

92. The method of making a sensitized element comprising forming an emulsion which is sensitive to reddish light and impregnating the emulsion with a dye which further sensitizes to a colder color without substantially desensitizing to reddish light.

93. The method of making a sensitized element comprising forming an emulsion which is sensitive to reddish light and impregnating the emulsion with a dye which further sensitizes to a greenish color without substantially desensitizing to reddish light.

94. The method of making a photographic film comprising forming a layer of emulsion which is predominantly transmissive to light of a predetermined color, and sensitizing the emulsion throughout a portion of its depth to approximately the same color.

95. A photographic element comprising an image-bearing strip having latent complemental images at different depths therein.

96. A photographic element comprising an image-bearing strip having latent complemental images at different depths therein, one of the images being relatively flat compared to another.

97. A photographic element comprising an image-bearing strip having latent complemental images at different depths therein, one of the images having negligible contrast compared to another.

98. A photographic element comprising an image-bearing strip having latent complemental images at different depths therein, the colder-color image being relatively flat compared to the warmer-color image.

99. A photographic element comprising an image-bearing strip having latent substantially non-interpenetrating images at different depths therein.

100. A photographic element comprising an image-bearing strip having latent substantially non-interpenetrating images at different depths therein, one of the images being relatively flat compared to another.

101. A photographic element comprising an image-bearing strip having latent substantially non-interpenetrating images at different depths therein, one of the images having negligible contrast compared to another.

102. A photographic element comprising an image-bearing strip having latent substantially non-interpenetrating complemental images at different depths therein.

103. A photographic element comprising an image-bearing strip having latent substantially non-interpenetrating complemental images at different depths therein one of the images being relatively flat compared to another.

104. A photographic element comprising an image-bearing strip having latent substantially non-interpenetrating complemental images at different depths therein, one of the images having negligible contrast compared to another.

105. A photographic element comprising an image-bearing strip having latent substantially non-interpenetrating complemental images at different depths therein, the colder-color image being relatively flat compared to the warmer-color image.

106. A photographic element comprising a support and a coating on the support, the coating having at different depths therein latent images corresponding to complemental color aspects.

107. A photograph element comprising a support and a coating on the support, the coating having at different depths therein latent images corresponding to complemental color aspects, one of the images being relatively flat compared to another.

108. A photographic element comprising a support and a coating on the support, the coating having at different depths therein latent images corresponding to complemental color aspects, one of the images having negligible contrast compared to another.

109. A photographic element comprising a support and a coating on the support, the coating having at different depths therein latent images corresponding to complemental color aspects, the colder-color image being relatively flat compared to the warmer-color image.

110. A photographic element comprising a support and a coating on the support, the coating having at different depths therein substantially non-interpenetrating latent images corresponding to complemental color aspects.

111. A photographic element comprising a support and a coating on the support, the coating having at different depths therein substantially non-interpenetrating latent images corresponding to complemental color aspects, one of the images being relatively flat compared to another.

112. A photographic element comprising a support and a coating on the support, the coating having at different depths therein substantially non-interpenetrating latent images corresponding to complemental color aspects, one of the images having negligible contrast compared to another.

113. A photographic element comprising a gelatine layer having superposed complemental latent images in different strata thereof.

114. A photographic element comprising a gelatine layer having superposed complemental latent images in different strata thereof, one of the images being relatively flat compared to another.

115. A photographic element comprising a gelatine layer having superposed complemental latent images in different strata thereof, one of the images having negligible contrast compared to another.

116. A photographic element comprising a gelatine layer having superposed complemental latent images in different strata thereof, the colder-color image being relatively flat compared to the warmer-color image.

117. A photographic element comprising a gelatine layer having superposed substantially non-interpenetrating latent images in different strata thereof.

118. A photographic element comprising a gelatine layer having superposed substantially non-interpenetrating latent images in different strata thereof, one of the images being relatively flat compared to another.

119. A photographic element comprising a gelatine layer having superposed substantially non-interpenetrating latent images in different strata thereof, one of the images having negligible contrast compared to another.

120. A photographic element comprising a gelatine layer having superposed substantially non-interpenetrating latent images in different strata thereof, the images corresponding to complemental color aspects.

121. A photographic element comprising a gelatine layer having superposed substantially non-interpenetrating latent images in different strata thereof, the images corresponding to complemental color aspects, one of the images being relatively flat compared to another.

122. A photographic element comprising a gelatine layer having superposed substantially non-interpenetrating latent images in different strata thereof, the images corresponding to complemental color aspects, and one of the images having negligible contrast compared to another.

123. A photographic film comprising a single emulsion containing in successive strata superposed complemental images based in the same direction.

124. A photographic film comprising a support and a single emulsion coating on one side of the support containing in successive strata a plurality of complemental images based toward the support.

125. A photographic film comprising a single emulsion containing distinct images in successive strata respectively, a plurality of the images being based in the same direction.

126. A photographic film comprising a single emulsion containing distinct images in successive strata respectively, a plurality of the images being based toward the support.

127. A photographic film comprising an emulsion containing in successive layers superposed images based toward the support.

128. A photographic film comprising an emulsion containing in successive layers superposed complemental images based toward the support.

129. A photographic film comprising an emulsion containing complemental images in successive layers, one image being sufficiently transparent relatively to the other image that the latter image may be printed by light passing through the first image.

130. A photographic film comprising an emulsion containing complemental images in successive layers, one image being flat relatively to the other image.

131. A photographic element comprising a support and a plurality of coatings on the same side of the support, two of said coatings having therein, respectively, non-interpenetrating latent images corresponding to complemental color aspects.

132. A photographic element comprising a support and a plurality of coatings on the same side of the support, two of said coatings having therein, respectively, non-interpenetrating latent images corresponding to complemental color aspects and being separated by a third coating.

133. A photographic negative, comprising an image-bearing strip having complemental images therein at different depths.

134. A photographic negative, comprising an image-bearing strip having substantially non-interpenetrating images therein at different depths.

135. A photographic negative comprising an image-bearing strip having substantially non-interpenetrating complemental images therein at different depths.

136. A photographic negative comprising a transparent support and a coating on the support, the coating having at different depths therein substantially non-interpenetrating images representing complemental color aspects.

137. A photographic negative comprising a transparent support and a coating on the support, the coating having complemental images therein at different depths, the image nearest the support being relatively flat compared to another image.

138. A photographic negative comprising a transparent support and a coating on the support, the coating having substantially non-interpenetrating images therein at different depths, the image nearest the support being relatively flat compared to another image.

139. A photographic negative comprising a transparent support and a coating on the support, the coating having substantially non-interpenetrating complemental images therein at different depths, the image nearest the support being relatively flat compared to another image.

140. A photographic negative having a plurality of superposed developed images, one of the images being substantially transparent.

141. A photographic negative having a plurality of superposed developed complemental images, one of the images being substantially transparent.

142. A photographic negative having a plurality of superposed substantially non-interpenetrating developed images, one of the images being substantially transparent.

143. A photographic negative having a plurality of superposed developed complemental images, one of the images being transparent and relatively thin.

144. A photographic negative having a plurality of superposed developed images, the image representing the colder color being substantially transparent.

145. A photographic negative comprising a transparent support, a coating on the support having a plurality of superposed developed images, the image next to the support being substantially transparent.

146. A photographic negative comprising a transparent support, a coating on the support having a plurality of superposed developed images, the image next to the support representing the colder color and being substantially transparent.

147. A photographic negative having a plurality of superposed developed images on the same side of the support, one of the images being constituted by transparent silver salt.

148. A photographic negative having a plurality of superposed developed complemental images on the same side of the support, one of the images being constituted by transparent silver salt.

149. A photographic negative having a plurality of superposed substantially non-interpenetrating developed images on the same side of the support, one of the images being constituted by transparent silver salt.

150. A photographic negative having a plurality of superposed developed images on the same side of the support, the image representing the colder color being constituted by transparent silver salt.

151. A photographic negative comprising a transparent support, a coating on the support having a plurality of superposed developed images, the image next to the support being constituted by transparent silver salt.

152. A photographic negative comprising a transparent support, a coating on the support having a plurality of superposed developed images, the image next to the support representing the colder color being constituted by transparent silver salt.

153. The method of producing multiplex images which comprises simultaneously forming different color-value images in successive strata of an emulsion by selective exposure to different color components of a polychromatic beam and obstructing the passage of any component to a stratum beyond that predominantly exposed thereby.

154. The method of producing multiplex images which comprises simultaneously forming two different color-value images in two successive strata of an emulsion by selective exposure to two different color components of a polychromatic beam and with the first stratum substantially preventing the passage of the component with which the first stratum is predominantly exposed.

155. The method which comprises simultaneously forming, with a single polychromatic beam of light, different color-value images in successive strata of an emulsion sensitized to different color components of light by selectively absorbing, with certain of the strata, the color component to which each such stratum is sensitive.

156. The method which comprises simultaneously forming different color-value images of a colored scene in respective strata of an emulsion with a single polychromatic beam of light by selectively absorbing and transmitting the color components of the light in accordance with the color sensitivity of the successive strata.

157. The method which comprises concomitantly forming complemental images respectively in successive strata of an emulsion by selective exposure to different color components of a polychromatic beam and absorbing certain of the components by the stratum selectively exposed thereby.

158. The method which comprises concomitantly forming two complemental images respectively in two successive strata of an emulsion by selective exposure to two different color components of a polychromatic beam and with the first stratum substantially preventing the passage of the component with which the first stratum is predominently exposed.

159. The method of making superposed complemental images in a single emulsion which comprises forming the images in latent form in different depths of the emulsion respectively, and developing the images concomitantly.

160. The method of making superposed complemental images in a single emulsion which comprises simultaneously forming the images in latent form in different depths of the emulsion respectively, and developing the images concomitantly.

161. The method of making superposed complemental images in a single emulsion which comprises incorporating within the emulsion a light-retarding dye, forming the images in latent form in different depths of the emulsion respectively, one of the images being restricted to a partial depth of the emulsion by the light-retarding dye, and developing the images concomitantly.

162. A method of producing a color photograph comprising forming in layers of emulsion sensitized respectively to record different color values, a plurality of superimposed latent images of different color sensations, developing said latent images and coloring the images thus developed respectively in colors other than those whose values are recorded in the said respective images.

163. A method of producing a color photograph comprising forming in layers of emulsion sensitized respectively to record different color values, a plurality of superimposed latent images of different color sensations, developing said latent images and coloring each of the respective images thus developed with a color whose values are recorded by another of said images.

164. The method of producing a color photograph in two colors comprising forming in layers of emulsion sensitized respectively to record different color values and combined to constitute a substantially unitary body, two superimposed latent images of different color sensations, simultaneously developing and then fixing said two images and then coloring each of said images with that color whose values are recorded by the other image.

165. The method of producing a color photograph which comprises concomitantly forming, in united layers of emulsion respectively sensitized to record different color values, a plurality of superposed latent images recording different color values.

166. The method of producing color photograph which comprises concomitantly forming, in superposed strata of emulsion mounted on the same side of a support and sensitized to different color values respectively, a plurality of superposed latent images recording different color values.

167. The method of producing a color photograph which comprises concomitantly forming, in united layers of emulsion respectively sensitized to record different color values, a plurality of superposed latent images recording different color values, and concomitantly developing said images.

168. The method of producing a color photograph with a suitable support having on one side layers of emulsion sensitized respectively to record different color values, which comprises forming simultaneously in said layers of emulsion two latent images recording respectively the orange-red and the blue-green of the spectrum, the effect of the blue-violet light upon the latter image being diminished by excluding a part of said light from the portion of the emulsion affected thereby and then developing and coloring the images formed.

169. The method of making complemental images in an emulsion sensitized to complemental colors at different depths, which comprises exposing the emulsion with light of the complemental colors, restricting to the first depth substantially all light of the color to which it is sensitized, and transmitting to a succeeding depth light of the color to which it is sensitized, whereby complemental images are formed in the respective depths.

170. The method of making a photographic element having images at different depths which includes the step of treating the images with a developer having a high diffusion tendency and a low reduction potential.

171. The method of making a photographic element having images at different depths which includes the step of reducing the exhaustive effect of the outer image on the inner image by the use of hydroquinone and an alkali.

172. The method of making a photographic element having images at different depths which includes the step of reducing the exhaustive effect of the outer image on the inner image by the use of hydroquinone and bromide.

173. The method of making a photographic element having images at different depths which includes the step of reducing the exhaustive effect of the outer image on the inner image by the use of hydroquinone and an alkaline carbonate and bromide.

174. The method of making a photographic element having images at different depths which includes swelling the gelatine by introducing a liquid thereinto, and subsequently developing the images.

175. The method of making a photographic element having images at different depths which includes swelling the gelatine by introducing a liquid thereinto, and subsequently treating the images with a developer having a high diffusion tendency and a low reduction potential.

176. The method of making a photographic element having images at different depths therein which includes the step of fogging a stratum of the emulsion before developing the images.

177. The method of making a photographic element having images at different depths therein which includes the step of fogging an inner stratum of the emulsion before developing the images.

178. The method of making a photographic element having images at different depths therein which includes the step of fogging and swelling the gelatine before developing the images.

179. The method of making a photographic element having images at different depths therein which includes the step of fogging and swelling the gelatine and subsequently treating it with a developer having a high diffusion tendency and a low reduction potential.

180. The method of producing a color photograph which comprises concomitantly forming, in united layers of emulsion respectively sensitized to record different color values, a plurality of superposed latent images recording different color values, and reproducing said images in united layers of emulsion respectively sensitized to record different color values.

181. The method of producing a color photograph which comprises concomitantly forming, in united layers of emulsion respectively sensitized to record different color values, a plurality of superposed latent images recording different color values, and reproducing said images without separating said layers.

182. A method of producing a color photograph with a suitable support having on one side layers of emulsion sensitized respectively to record different color values which comprises forming simultaneously in said layers of emulsion a plurality of latent images of different color sensations, developing and coloring said images in the different respective colors without disturbing the relative positions of said images in said emulsion to thereby produce two superimposed images in different colors in an emulsion on one side of said support, and printing a positive from the negative thus formed.

183. The method of producing a color photograph with a suitable support having on one side layers of emulsion sensitized respectively to record different color values, which comprises forming in said layers of emulsion a plurality of superimposed images of the subject photographed, each of said images recording a different color sensation, individually coloring said images to form a negative in different colors without disturbing the relative positions of said images in said emulsion to thereby produce two superimposed images in different colors in an emulsion on one side of said support, printing from this negative in a single operation a positive to form on said positive a plurality of superimposed latent images of different color sensations, and subsequently developing and coloring said positive.

184. The method of producing a color photograph with a suitable support having on one side layers of emulsion sensitized respectively to record different color values, which comprises forming simultaneously in said layers of emulsion a plurality of latent images of different color sensations, developing all of said latent images, successively coloring the respective images and subsequently printing a positive from the negative thus formed, said positive being constituted similarly to the negative and being subjected to a similar treatment to produce the finished picture.

185. The method of producing a color photograph with a suitable support having on one side layers of emulsions sensitized respectively to record different color values, which comprises forming simultaneously in said layers of emulsion a plurality of latent images of different color sensations, subsequently developing and coloring the respective images to form a negative, forming a positive comprising a plurality of coatings sensitized respectively for colors complementary to the colors employed in the negative, printing the positive in a single operation, and subsequently developing and toning the images formed on said positive.

186. The method of reproducing images superposed on the same side of a support which comprises rendering one image relatively ineffective on printing light and passing light through both images to print the other image.

187. The method of making color pictures which comprises separately printing superposed complemental pictures, one image being printed by light passing through the other image, and the latter image being rendered relatively ineffective during the printing of the first image.

188. The method of separating superposed components of a representation of two color aspects of an object field on the same side of a support which comprises printing one component by light passing through the representation of both color aspects, the other component being rendered substantially ineffective during the printing of the first component.

189. The method of separating superposed components of a representation of two color aspects of an object field which comprises printing one component by light passing through the representation of both color aspects, the other component being rendered substantially ineffective during the printing of the first component, then removing the first component and printing the second component.

190. The method of separating superposed components of a representation of two color aspects of an object field which comprises printing one component by light passing through the representation of both color aspects, the other component being rendered substantially ineffective during the printing of the first component, removing the first component, and then rendering the second component effective and printing the same.

191. The method of making color pictures from superposed complemental images which comprises printing one image without separating the images, and then removing the printed image and printing the other image.

192. The method of making color pictures from superposed complemental images which comprises printing one image without separating the images, and then etching off the printed image and printing the other image.

193. The method of making color pictures from superposed complemental silver images which includes treating the images with a bleach containing a reducer.

194. The method of making color pictures from superposed complemental silver images which includes treating the images with a bleach containing an alkali sulphite.

195. The method of making color pictures from superposed complemental silver images which includes treating the images with a bleach acting with sufficient rapidity substantially to prevent the images from affecting each other.

196. The method of making color pictures from superposed complemental silver images which includes treating the images with a bleach to harden the gelatine throughout the images while preventing the diffusion of gelatine hardening substances from one image to another.

197. The method of making color pictures from superposed complemental silver images which includes hardening the gelatine throughout each image and then separating the images by dissolving the soft gelatine therebetween.

198. The method of making color pictures from superposed complemental silver images which comprises printing one image, bleaching the images, etching off the printed image, and printing the other image.

199. The method of making color pictures from superposed complemental silver images which comprises printing one image, bleaching the images, etching off the printed image, and then intensifying and printing the other image.

200. The method of making color pictures from superposed complemental silver images which comprises printing one image, bleaching the images, etching off the printed image, and then staining and printing the other image.

201. The method of making color pictures from superposed complemental silver images which comprises bleaching and separating the images, and dyeing one image with a dye having a heavy staining power.

202. The method of making color pictures from superposed complemental silver images which comprises bleaching and separating the images, and dyeing one image with a dye having a heavy staining power and having a slow washing out rate.

203. The method of making color pictures from superposed complemental silver images which comprises printing one image, bleaching and separating the images, and dyeing one image with a dye having a heavy staining power.

204. The method of making color pictures comprising simultaneously forming, by composite light, complemental images at different depths in an emulsion adapted to respond predominantly to different light components at different depths, and separately reproducing the complemental images in different colors.

205. The method of making color pictures comprising simultaneously forming, by composite light, complemental images at different depths in an emulsion adapted to respond predominantly to different light components at different depths, and separately printing and coloring the complemental images.

206. The method of making color pictures comprising exposing an emulsion having superposed strata sensitive to light components of different colors, simultaneously to form complemental images in the respective strata, and separately printing the images to form complemental pictures, the image of one layer being printed by light passing through the other layer, the image of the other layer being rendered substantially ineffective during the printing of the first image.

207. The method of making color pictures comprising exposing an emulsion having superposed strata sensitive to light components of different colors, simultaneously to form complemental images in the respective strata, and printing the images to form complemental pictures, at least one image being printed without separating the layers.

208. The method of separating superposed components of a representation of two color aspects of an object field which comprises printing one component by light passing through the representation of both color aspects, the other component being rendered substantially ineffective during the printing of the first component.

209. The method of making color pictures which comprises forming a latent image in one stratum of a sensitized emulsion, simultaneously forming a relatively thin complemental latent image in another stratum of the emulsion, developing the images, printing the first image by passing light through both images, removing the first image, and printing the second image.

210. The method of making color pictures which comprises simultaneously forming complemental latent images in different strata of an emulsion by exposing the emulsion through its transparent support, making the first image next to the support substantially negligible compared to the second image, printing the second image by light passing through both images, removing the second image, and printing the first image.

211. The method of making color p'ctures which comprises forming superposed complemental silver images on the same side of a support, dyeing the images different colors and then printing the images respectively with light of different colors.

212. The method of making color pictures comprising simultaneously forming, by composite light, complemental images at different depths in an emulsion adapted to respond predominantly to different light components at different depths, and subsequently converting the respective images into a composite color picture.

313. The method of making color pictures comprising simultaneously forming complemental negatives at different depths in an emulsion, and subsequently producing positives from the negatives, the production of the positives including passing a beam of light through the negatives in series.

214. The method of making color pictures which comprises producing at different depths in an emulsion superposed components of a color representative of an object field, and subsequently reproducing the components by printing operations which include simultaneously passing a beam of light through all the components.

215. The method of making color pictures which comprises simultaneously producing components of a color representation in superposed layers of emulsion on the same side of a support and subsequently reproducing the components by printing operations which include simultaneously passing a beam of light through all the components.

216. The method of producing a color photograph, comprising forming in layers of emulsion on the same side of their support and sensitized respectively to record different color values a plurality of superimposed images of the subject photographed, each of said images recording a different color sensation, individually coloring said images to form a negative in proper colors, printing from this negative in a single operation a positive to form on said positive a plurality of superimposed latent images of different color sensations, and subsequently developing and coloring said positive.

217. A method of producing a color photograph, comprising forming simultaneously in layers of emulsion on the same side of their support and sensitized respectively to record different color values a plurality of latent images of different color sensations, developing all of said latent images, successively coloring the respective images, and subsequently printing a positive from the negative thus formed, said positive being constituted similarly to the negative and being subjected to a similar treatment to produce the finished picture.

218. The method of producing a color photograph, comprising forming simultaneously in layers of emulsion on the same side of their support and sensitized to record respectively different color values a plurality of latent images of different color sensations, subsequently developing and coloring the respective images to form a negative, forming a positive comprising a plurality of coatings sensitized respectively for colors complementary to the colors employed in the negative, printing the positive in a single operation and subsequently developing and toning the images formed on said positive.

219. The method of producing a color photograph, comprising forming simultaneously in layers of emulsion on the same side of their support, and sensitized respectively to record different color values, two latent images recording respectively the orange-red and the blue-green of the spectrum, the effect of the blue-violet light upon the latter image being diminished by excluding a part of said light from the portion of the emulsion affected thereby and then developing and coloring the images formed.

220. The method of producing a color photograph, comprising forming in layers of emulsion on the same side of their support and sensitized respectively to record different color values a plurality of latent images of different color sensations, simultaneously developing said images completely and then fixing the developed images whereupon a black and white negative bearing correctly represented color values but not being actually colored is obtained.

221. The method of producing a color photograph, comprising forming simultaneously in layers of emulsion on the same side of their support and sensitized respectively to record different color values, two superimposed latent images of different color sensations, simultaneously developing said two images completely and then fixing the developed images whereupon a black and white negative bearing correctly represented values but not being actually colored is obtained.

222. The method of producing a color photograph, comprising forming in layers of emulsion on the same side of their support and sensitized respectively to record different color values, a plurality of latent images of different color sensations, simultaneously developing said images completely and then fixing the developed images and then coloring the respective images with the proper colors.

223. The method of producing a color photograph, comprising forming in layers of emulsion on the same side of their support and sensitized respectively to record different color values a plurality of latent images recording different portions of the spectrum, simultaneously developing said images completely and then fixing the developed images, coloring the respective images, and printing a positive from the negative thus formed, said positive being constituted similarly to the negative and being subjected to a similar treatment to produce the finished picture.

224. The method of producing a color photograph which comprises providing a suitable support having on one side layers of emulsion sensitized respectively to record different color values, forming in said layers of emulsion a plurality of latent images of different color sensations, simultaneously developing said images completely and then fixing the developed images whereupon a black and white negative bearing correctly represented color values but not being actually colored is obtained.

225. The method of producing a color photograph which comprises providing a suitable support having on one side layers of emulsion sensitized respectively to record different color values, forming simultaneously in said layers of emulsion two superimposed latent images of different color sensations, simultaneously developing said two images completely and then fixing the developed images whereupon a black and white negative bearing correctly represented values but not being actually colored is obtained.

226. The method of producing a color photograph which comprises providing a suitable support having on one side layers of emulsion sensitized respectively to record different color values, forming in said layers of emulsion a plurality of latent images of different color sensations, simultaneously developing said images completely and then fixing the developed images and then coloring the respective images with the proper colors.

227. The method of producing a color photograph which comprises providing a suitable support having on one side layers of emulsion sensitized respectively to record different color values, forming in said layers of emulsion a plurality of latent images recording respectively the orange-red and the blue-green of the spectrum, simultaneously developing said images completely and then fixing the developed images, coloring the respective images, and printing a positive from the negative thus formed, said positive being constituted similarly to the negative and being subjected to a similar treatment to produce the finished picture.

228. The method of producing a color photograph which comprises forming latent complemental images in different strata of emulsion on the same side of a film, simultaneously developing the images, and coloring the developed images different colors respectively.

229. The method of producing a color photograph which comprises printing complemental images in different superposed coatings on the same side of a positive film, developing the images in said coatings in the same developing operation, and coloring the developed images in the different coatings different colors.

230. The method of producing a color photograph which comprises forming latent complemental images in different strata of emulsion on the same side of a film while restraining interpenetration of the images by an intermediate stratum, developing the images and coloring them different colors.

231. The method of producing a color photograph which comprises forming latent complemental images in different coatings of emulsion on the same side of a film while restraining interpenetration of the images by an intermediate coating, developing the images in the same developing operation and coloring them different colors.

232. A photographic film for making color pictures comprising a base having on the same side a plurality of coatings including one coating which is sensitive to a color to which a second coating on the entrant side of said first coating is substantially insensitive and the second coating being sufficiently absorptive of other colors substantially to restrict the exposure of said first coating to light of said first color.

233. A photographic film for making color pictures which comprises a base having on the same side a plurality of coatings including one coating which is sensitive to a reddish color to which a second coating on the entrant side of said first coating is substantially insensitive and the second coating being sufficiently absorptive of colder colors to cause said first coating to record an image of the reddish color aspect of an object field to which the film is exposed from said entrant side.

234. A photographic film comprising a support and two coatings on the same side thereof, one coating being sensitive to light of a color to which the other coating is substantially insensitive and the latter coating constituting a filter.

235. A photographic film comprising a support and two coatings on the same side of the support, one coating being sensitive to light of a color to which the other coating is substantially insensitive and the latter coating constituting a filter.

236. A photographic film comprising a support and two coatings on the same side thereof, one coating being sensitive to light of a color to which the other coating is substantially insensitive and the latter coating constituting a filter for absorbing light of complementary color.

237. A support having a photographic emulsion sensitive to a portion of the spectrum, a second support having a photographic emulsion sensitive to another portion of the spectrum, said emulsions being placed in close relation between the two supports and one emulsion having fast to its surface a coating of substantial thickness containing coloring matter which absorbs a part of the spectrum.

238. A support having a photographic emulsion sensitive to a portion of the spectrum, a second support having a photographic emulsion sensitive to another portion of the spectrum, said emulsions being placed in close relation between the two supports and one emulsion having on its surface a coating of substantial thickness containing coloring matter which absorbs light to which the emulsion preceding this coating is sensitive.

239. A photographic film for making color pictures comprising a base having on the same side a plurality of coatings, including one of substantial thickness which is permeable to developer and which absorbs substantially completely a color to which another coating on the entrant side of said first coating is sensitive but which transmits other light.

Signed by me at Los Angeles, California, this 5th day of April, 1932.

LEONARD T. TROLAND.